Patented July 11, 1933

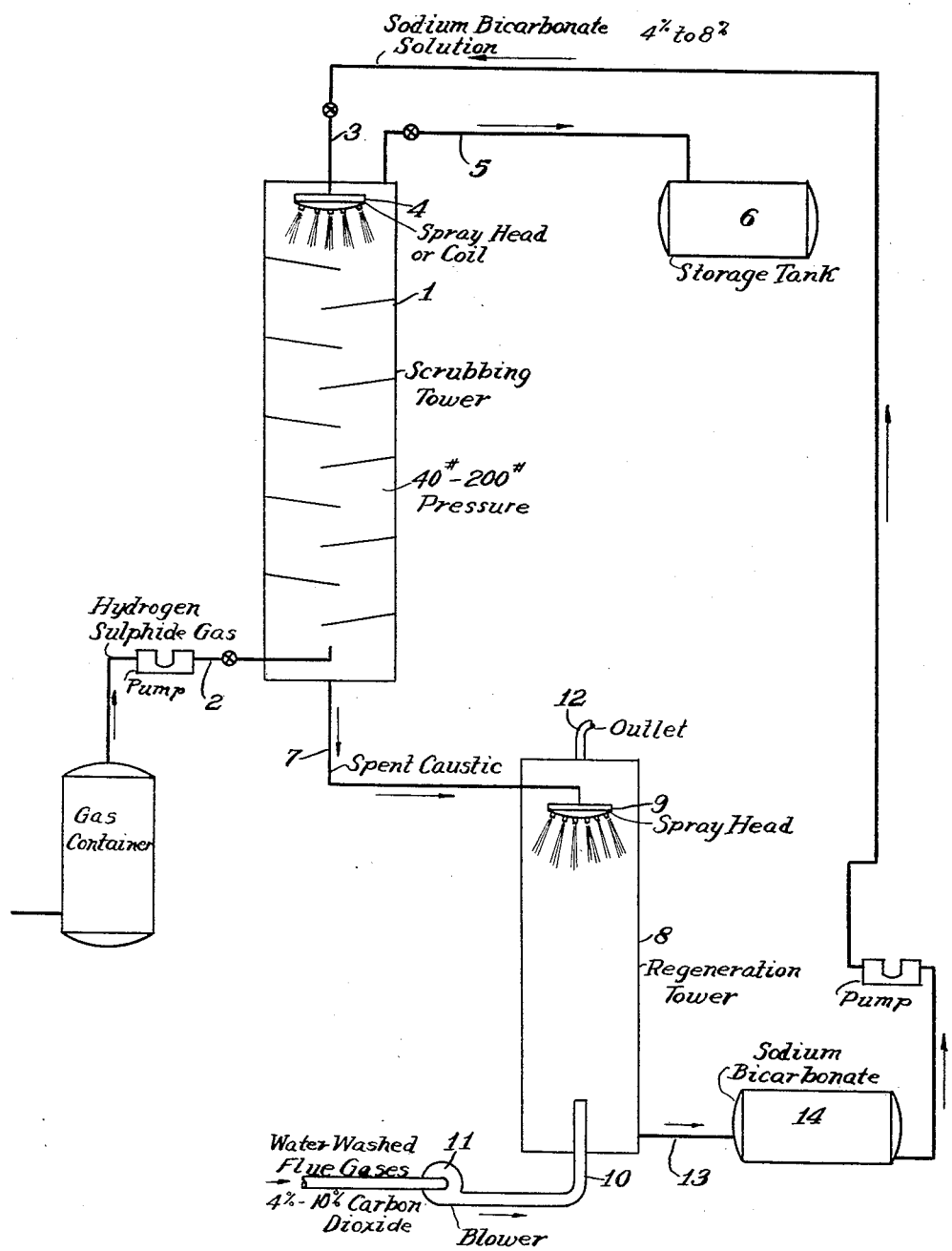

1,918,153

UNITED STATES PATENT OFFICE

CARY R. WAGNER, OF CHICAGO, ILLINOIS, ASSIGNOR TO THE PURE OIL COMPANY, OF CHICAGO, ILLINOIS, A CORPORATION OF OHIO

PROCESS FOR EXTRACTING HYDROGEN SULPHIDE FROM REFINERY GASES

Application filed March 18, 1931. Serial No. 523,644.

This invention relates to an improved process for gas purification, employing an alkaline absorbent agent for effecting the removal of hydrogen sulphide from hydrocarbon gases produced by oil cracking operations. During oil cracking processes or operations, considerable quantities of fixed gas are produced, the amount of gas so formed depending usually upon the temperatures employed in effecting the cracking or conversion reactions. That is, in high temperature cracking processes, the amount of gas produced in proportion to the amount of oil charged to the process, is greater than that produced by low temperature cracking processes. Most of this gas contains hydrogen sulphide in sufficient volumes to cause severe and troublesome corrosion of recovery or other equipment through which the gas is passed or contained, and it is therefore an outstanding object of the present invention to provide an improved process for removing from gas of the character described to a desired degree its hydrogen sulphide content and to accomplish this end in a more efficient and simplified manner than has been heretofore proposed.

For the further understanding of the invention, reference is to be had to the following description and the accompanying drawing, wherein the figure is a diagrammatic view representing apparatus which may be used in carrying the present process into practical operation.

In the accompanying drawing, the numeral 1 designates a scrubbing tower, into the bottom of which there is led a gas line 2 by which hydrocarbon gases obtained, for example, from a cracking plant and containing undesirable quantities of hydrogen sulphide is passed in upwardly directed flow through the tower. While passing upwardly through the tower, the gas is brought into intimate counter-current contact with an alkaline solution composed preferably of caustic soda or sodium bi-carbonate. This solution may be introduced into the top of the tower by means of a pipe line 3 which terminates within the tower in a spray head or coil 4. Preferably, the solution of sodium bi-carbonate thus introduced into the tower contains between 4% and 8% of weight of $NaHCO_3$. Preferably, pressures of the order from 40 to 200 pounds per square inch are maintained in the tower during the counter-current scrubbing of the gases with the alkaline absorbent. The treated gases are removed from the top of the tower by way of an outlet line 5 and may be passed to a storage container or to other desired apparatus, the container being designated by the numeral 6. It is preferred that the scrubbing of the gas be accomplished under suitable superatmospheric pressures, as above specified, since this condition appears to be favorable to the absorption of hydrogen sulphide by the bi-carbonate solution. Also, I preferably use the counter-current method of contact between the alkaline absorbent solution and the hydrogen sulphide containing gas, since by this method of operation, improved contact obtains and the effectiveness or efficiency of the operation is materially improved.

The spent solution of caustic or sodium bi-carbonate is removed from the tower 1 by means of a pipe line 7 and delivered to the top of a regeneration tower 8, passing downwardly through said tower from a spray head 9. In the tower 8 hot flue gases are passed or blown through the said spent caustic solution to convert the sodium hydrogen sulphide into sodium bi-carbonate, the regenerated sodium bi-carbonate solution then being returned to the scrubbing tower and reused for further gas purification purposes.

The spent bi-carbonate introduced into the tower 8 can be regenerated by blowing flue gases, containing from 4% to 10% of carbon dioxide, up through the tower 8 counter-current to the descending stream of the spent bi-carbonate solution. The flue gases enter the bottom of the tower 8 by way of the pipe line 10, which leads from a furnace or other equivalent apparatus wherein flue gases are developed. The line 10 may be provided with a blower indicated at 11 to secure the desired passage of the flue gases upwardly through the tower. The flue gases may be discharged from the top of the tower by way of an outlet 12. In this manner, the hydrogen sulphide is released from combination and the bi-carbonate is regenerated. It is preferred that the flue gas be scrubbed with water to remove sulphur dioxide before using it to regenerate the bi-carbonate solution, inasmuch as the presence of sulphur dioxide in the flue gas would tend to effect the permanent removal of part of the sodium, since it would form a more stable compound than the sodium bi-carbonate. The regenerated bi-carbonate may be passed from the bottom of the tower 8 by way of a pipe line 13 to a working tank 14 and then led back as needed to the line 3.

It has been observed that under normal conditions and atmospheric pressure, carbonic acid gas, being a slightly stronger acid, will replace hydrogen sulphide from its compounds. That would indicate that the reaction disclosed by the present process would be impracticable, as is shown by equation (1):

$$NaHS + CO_2 + H_2O \rightleftharpoons NaHCO_3 + H_2S,$$ but it will be noticed that this is a reversible reaction which means that if proper control of the conditions is maintained, the reactions can be made to proceed in the opposite direction. This end is attained by applying pressure to the system, and it is practicable, due to the fact that both $HCO_3$ and $H_2S$ are very weak acids (the ionization constant of $H_2S$ being $9.1 \times 10^{-8}$ and that of $HCO_3$ being $3 \times 10^{-7}$). Hence when pressure is applied to the system and the solubility of $H_2S$ gas greatly increased thereby, the effect is to increase its concentration enormously so that at 40 pounds pressure above atmospheric the concentration of $HS^-$ exceeds the concentration of $HCO^-_3$ (which remains practically unchanged) and the reaction proceeds in the opposite direction, and may be expressed by equation 2):

$$NaHCO_3 + H_2S \rightleftharpoons NaHS + CO_2 + H_2O$$

which is exactly the conditions required and secured by the present absorption process.

As can readily be seen, equation (1) expresses the action which takes place in the recovery process where flue gases high in $CO_2$ content are passed through the spent liquor.

What is claimed is:

1. In a process for removing hydrogen sulphide from hydrocarbon gases, the combination of steps that consist in: passing the gas under pressure sufficient to greatly increase the concentration of the HS ion in counter-current flow in a confined high pressure zone through a saturated solution of sodium bi-carbonate to absorb the hydrogen sulphide from the gas, subjecting the spent solution containing the absorbed hydrogen sulphide to contact with flue gases to remove such hydrogen sulphide from and effect a regenation of the alkaline solution, and utilizing the rejuvenated solution for further gas treatment.

2. In a process for removing hydrogen sulphide from hydrocarbon gases developed by the cracking of oils, which consists in introducing such gas under superatmospheric pressures in a reaction zone, simultaneously introducing into another portion of said zone a sodium bi-carbonate solution containing 4% to 8% of $NaHCO_3$, intimately contacting said solution in said zone with said gas while the gas and solution are moving in counter-current relationship through the reaction zone, removing from one portion of said zone the purified gas, and separately removing from one portion of said zone the spent alkaline solution and then regenerating the same with carbon dioxide.

3. In a process for effecting the removal of hydrogen sulphide from hydrocarbon gases, the steps which consist: in introducing such gas into a reaction zone, simultaneously introducing into said reaction zone a solution consisting of sodium bicarbonate contacting the gas with said solution while the latter are moving through said zone in counter-current relationship, maintaining said zone under superatmospheric pressures between 40 and 200 pounds per square inch, removing from one portion of said zone the purified gas, and removing from another portion of said zone the spent alkaline solution and then regenerating the same with carbon dioxide.

4. In a process for removing hydrogen sulphide from hydrocarbon gases, the combination of steps that consist in: passing the gas under pressure sufficient to greatly increase the concentration of the HS ion in a primary reaction zone through a solution consisting of sodium bi-carbonate whereby to absorb the hydrogen sulphide from the gas, removing the purified gas from said reaction zone, passing the spent alkaline solution containing the absorbed hydrogen sulphide through a regeneration zone, bringing said solution while in said regeneration zone into intimate contact with flue gases substantially free from sulphur dioxide whereby to obtain sodium bi-carbonate from the spent solution, and reusing the regenerated sodium bi-carbonate in said primary reaction zone.

In testimony whereof I affix my signature.

CARY R. WAGNER.